United States Patent [19]

Hahn

[11] Patent Number: 5,646,818

[45] Date of Patent: Jul. 8, 1997

[54] ELECTRONIC APPLIANCE WITH LATERAL SUPPORT FOR DISPLAY UNIT AND KEYBOARD

[75] Inventor: Karl-Heinz Hahn, Eggenstein-Leopoldshafen, Germany

[73] Assignee: Siemens Aktiengesellschaft, Germany

[21] Appl. No.: 596,308

[22] PCT Filed: Aug. 8, 1994

[86] PCT No.: PCT/DE94/00916

§ 371 Date: Feb. 13, 1996

§ 102(e) Date: Feb. 13, 1996

[87] PCT Pub. No.: WO95/05631

PCT Pub. Date: Feb. 23, 1995

[30] Foreign Application Priority Data

Aug. 19, 1993 [DE] Germany ............... 9312455 U

[51] Int. Cl.⁶ .................. G06F 1/16; H05K 5/00
[52] U.S. Cl. ............. 361/681; 361/680; 248/917
[58] Field of Search ................... 361/679–683; 364/708.1; 248/919–923, 917; G06F 1/16

[56] References Cited

U.S. PATENT DOCUMENTS 4,903,221  2/1990  Krenz .
5,107,402  4/1992  Malgouires ............... 361/680
5,175,672  12/1992 Conner et al. .
5,247,285  9/1993  Yokota et al. ............. 345/169
5,267,123  11/1993 Boothroyd et al. ......... 361/680
5,383,138  1/1995  Motoyama et al. ......... 364/708.1

FOREIGN PATENT DOCUMENTS 9211955   11/1992  Germany .
WO9007742 7/1990   WIPO .

Primary Examiner—Leo P. Picard
Assistant Examiner—Lynn D. Feild
Attorney, Agent, or Firm—Kenyon & Kenyon

[57] ABSTRACT

An electronic appliance with a pivotable display unit, a keyboard and a foot assembly having two lateral supports, with each lateral support including a base part and an upward extending side face. The lateral supports laterally receive the display unit in pivot bearings of the side faces at approximately half of the height of the display unit and receive a rear portion of the keyboard in support mounts arranged in the front area of the base parts. The electronic appliance can be set on a desk but can also be operated when the keyboard is removed from the foot assembly and the display unit with the foot assembly is set on the floor or secured to a wall. The electronic appliance is suited for used in programming machines for stored program controls.

9 Claims, 3 Drawing Sheets

ELECTRONIC APPLIANCE WITH LATERAL SUPPORT FOR DISPLAY UNIT AND KEYBOARD

FIELD OF THE INVENTION

The present invention relates to an electronic appliance, in particular, to an electronic appliance with a display unit and a keyboard.

BACKGROUND INFORMATION

German Patent No. 39 36 261 C2 describes a portable computer, called a "laptop computer," that has a display unit which is configured as a flat plate and is arranged rotatably with respect to a base element. A keyboard is permanently installed in the front area of the base element in front of the pivot bearing of the display unit. The computer is equipped with a locking device so that for transport, the display unit can be secured in a position in which it covers the keyboard arranged on the base unit. For operation, the computer is placed on a desk, the lock is opened, and the display unit is swung up into a second position in which it allows operation of the keyboard and viewing of the display unit. With this electronic appliance, therefore, a suitable surface approximately at desk height is always needed for operability.

SUMMARY OF THE INVENTION

An object of the present invention is to provide an electronic appliance that is operable even in unfavorable physical conditions in which a support for the electronic appliance at desk height is absent.

The present invention provides an electronic appliance with a display unit and a keyboard which fulfills the aforementioned object and comprises two laterally arranged lateral supports upon which the display unit is pivoted, with each of the two lateral supports including a base part for providing a secure footing, with each base part including a support mount in a front portion of the base part, and a side member extending upward from a rear portion of the base part, each side member including a pivot bearing, wherein the display unit is pivotally supported approximately about its center of gravity by the pivot bearings of the side members and a rear portion of the keyboard is received by the support mounts of the base parts.

The present invention has the advantage that the electronic appliance imposes very few special requirements on its physical environment, and is operable in almost any industrial situation. This is particularly advantageous in the case of a programing machine for stored program controls, which must often be used on-site close to the process being controlled, and thus under difficult conditions. If a desk is available as support for the electronic appliance, to prepare for operation the display unit is swung approximately 30 degrees backward out of the transport position, and the keyboard is received at its rear area in bearings in the front area of the foot, so that it is secured against displacement. In this case the arrangement of the operating units is comparable to the arrangement with the known laptop computer. When no desk surface is available, on the other hand, it is then possible with the electronic appliance according to the present invention to place the foot, with the display unit received in pivot bearings, on the floor. In order for the display to be easily visible from above, it is swung approximately 90 degrees backward from the transport position. For better accessibility, the keyboard, which has a relatively low weight, can be removed from the foot and held in the hand or, if the user is in a seated position, placed on the lap. It is equally possible to fasten the foot to a wall so the display unit is at eye level. In this case the keyboard can either be held in the bearings on the foot or removed. The new electronic appliance is thus characterized by extremely high flexibility at the place of use. In addition it is easy to transport, since in the transport position it has no projecting parts and very compact dimensions. The transport position can be achieved with few manipulations, since the display must simply be swung to the vertical position, and the keyboard folded up. In addition the display unit and keyboard, which cover one another in the transport position, protect each other from damage during transport.

The present invention, as well as embodiments and advantages, will be explained in more detail below with reference to the drawings, in which exemplary embodiments of the invention are depicted.

DETAILED DESCRIPTION

Figure 1:
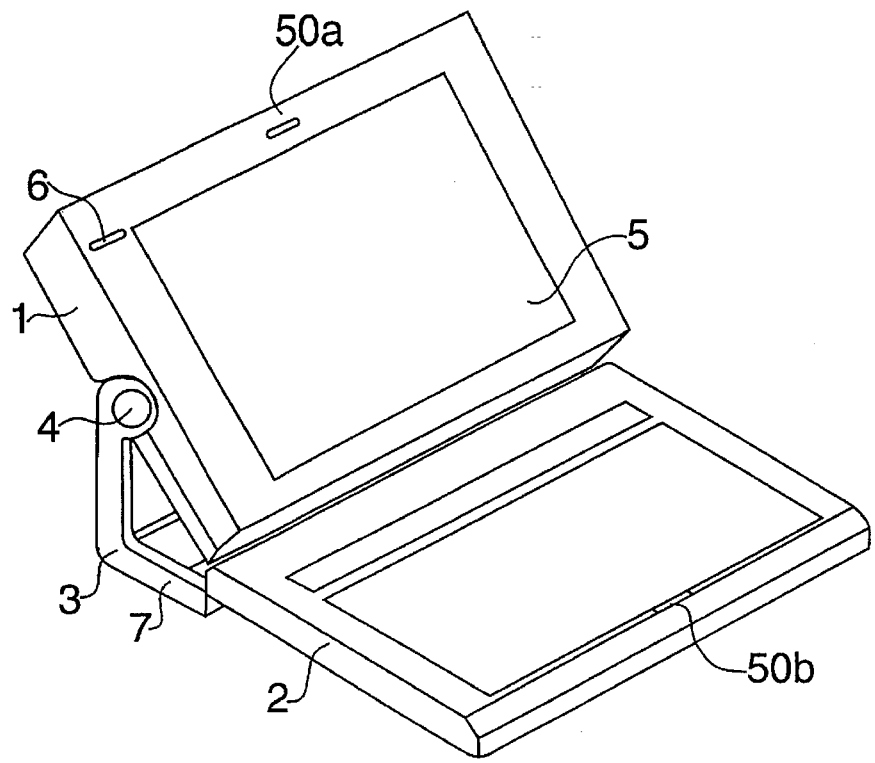
FIG. 1 shows a perspective view of an electronic appliance in accordance with the present invention in an operating configuration for placement typically on a desk surface.

As shown in FIG. 1, an embodiment of an electronic appliance in accordance with the present invention comprises a display unit 1, a keyboard 2, and a foot, of which only a left-hand lateral support 3 is visible in FIG. 1. The electronic appliance can serve, for example, as a convenient operating unit for a computing unit located elsewhere, or can itself contain the computing unit, which is then advantageously to be housed in the housing of the display unit. Display unit 1 is received on the foot in two pivot bearings, of which only left-hand pivot bearing 4 is visible in FIG. 1. With these, display unit 1 can be adjusted in ergonomically favorable fashion to the sitting position of a user. Display unit 1 contains a display surface 5, for example an LCD display. Also arranged on the display unit is a switch 6 for switching the electronic appliance on or off. The pivot point of display device 1 is in the vicinity of its center of gravity, so that the forces occurring at friction brakes in the pivot bearings are low. Keyboard 2 is held in bearings in the front area of the foot. The relative position of keyboard 2 with respect to display unit 1 is therefore stable and secured against inadvertent displacement by the user. A keyboard cable for electrical connection of keyboard 2 to display unit 1 is laid invisibly in a cable conduit with U-shaped cross section in the foot. It is guided on the left side of keyboard 2 in a base part 7 of lateral support 3, in the cable conduit located on the front of the foot, to the right side, and via the right-hand base part, the right-hand side face, and through the right-hand pivot joint, which are concealed in FIG. 1, into display unit 1. The keyboard is thus securely stowed and does not encumber the user during transport, setup, or operation of the electronic appliance.

Figure 2:
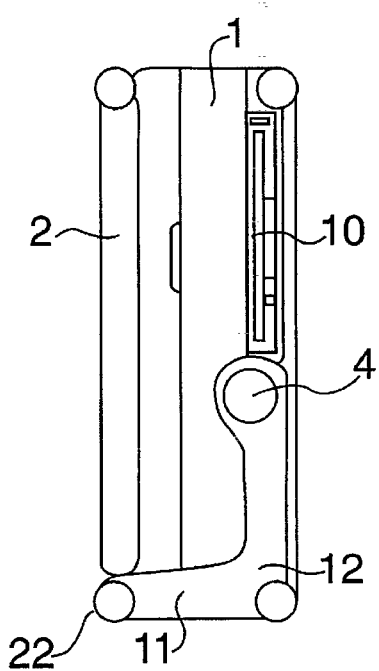
FIG. 2 shows an electronic appliance in accordance with the present invention in a transport configuration.

According to FIG. 2, in the transport position display unit 1 of an electronic appliance is placed vertically and keyboard 2 is folded up. In this position the keys and display surface of the electronic appliance are advantageously protected from damage by robust housing parts. In this exemplary embodiment a computing unit and a diskette drive 10 are contained in the electronic appliance. Located on the top of the electronic appliance is a locking mechanism 50a, 50b which prevents the keyboard from unintentionally falling down during transport. In the transport position as in the operable state, base part 11 of a right handed lateral support 12 provide a secure footing for the electronic appliance.

Figure 3:
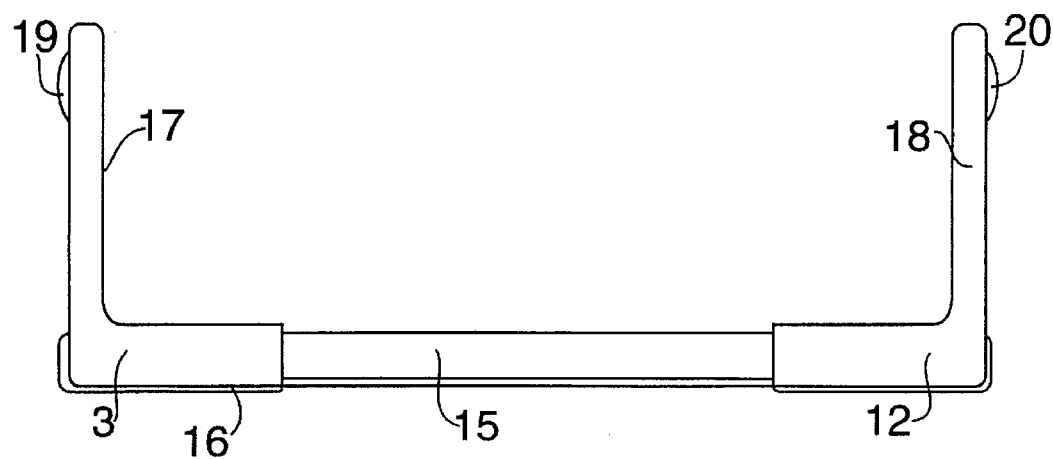
FIG. 3 shows a foot assembly of an electronic appliance in accordance with the present invention.

As shown in FIG. 3, visible in a view from behind of a foot assembly in accordance with the present invention, are a right-hand lateral support 3, a left-hand lateral support 12, and a cross-member 15 between the two lateral supports. To ensure a secure footing, the bottom surface of the foot is equipped with a non-slip coating 16. Projecting from side faces 17 and 18 of the two lateral supports 3 and 12, respectively, are lateral elevations 19 and 20, below which are located the pivot bearing and friction brake for receiving a display unit.

Figure 4:
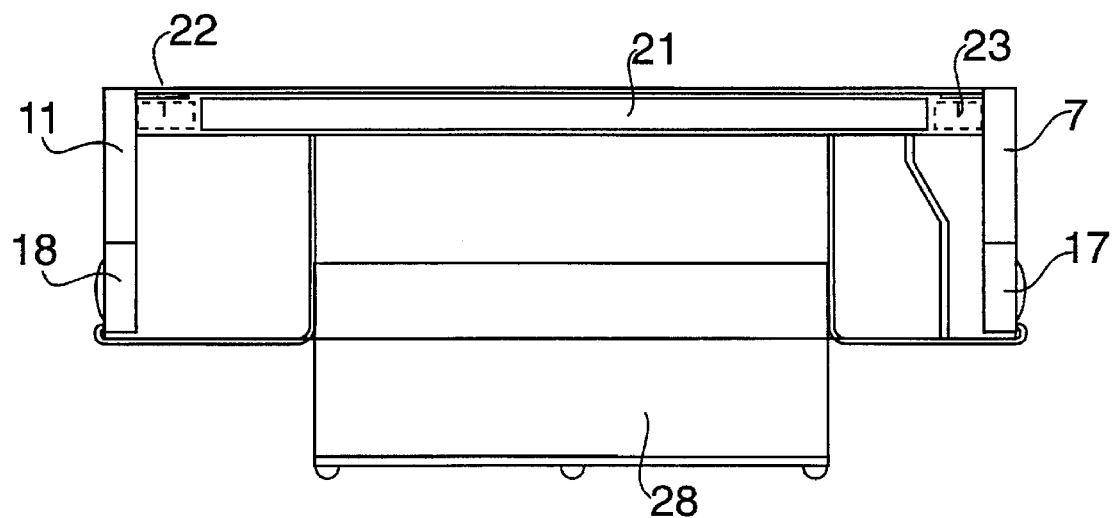
FIG. 4 shows a plan view of a foot assembly of an electronic appliance in accordance with the present invention.

According to FIG. 4, a cable conduit 21, in which a helical cable is housed, extends in the front part of the foot. For detachable mounting of the keyboard, movable pivot studs 22 and 23 are provided in the front part of base parts 11 and 7 of the foot, while side faces 18 and 17, with pivot joints for mounting a display unit, are arranged in the rear part. To increase the effective footprint and thus prevent the electronic appliance from tipping over, the foot has a support 28 that can be pulled out to the rear.

Figure 5:
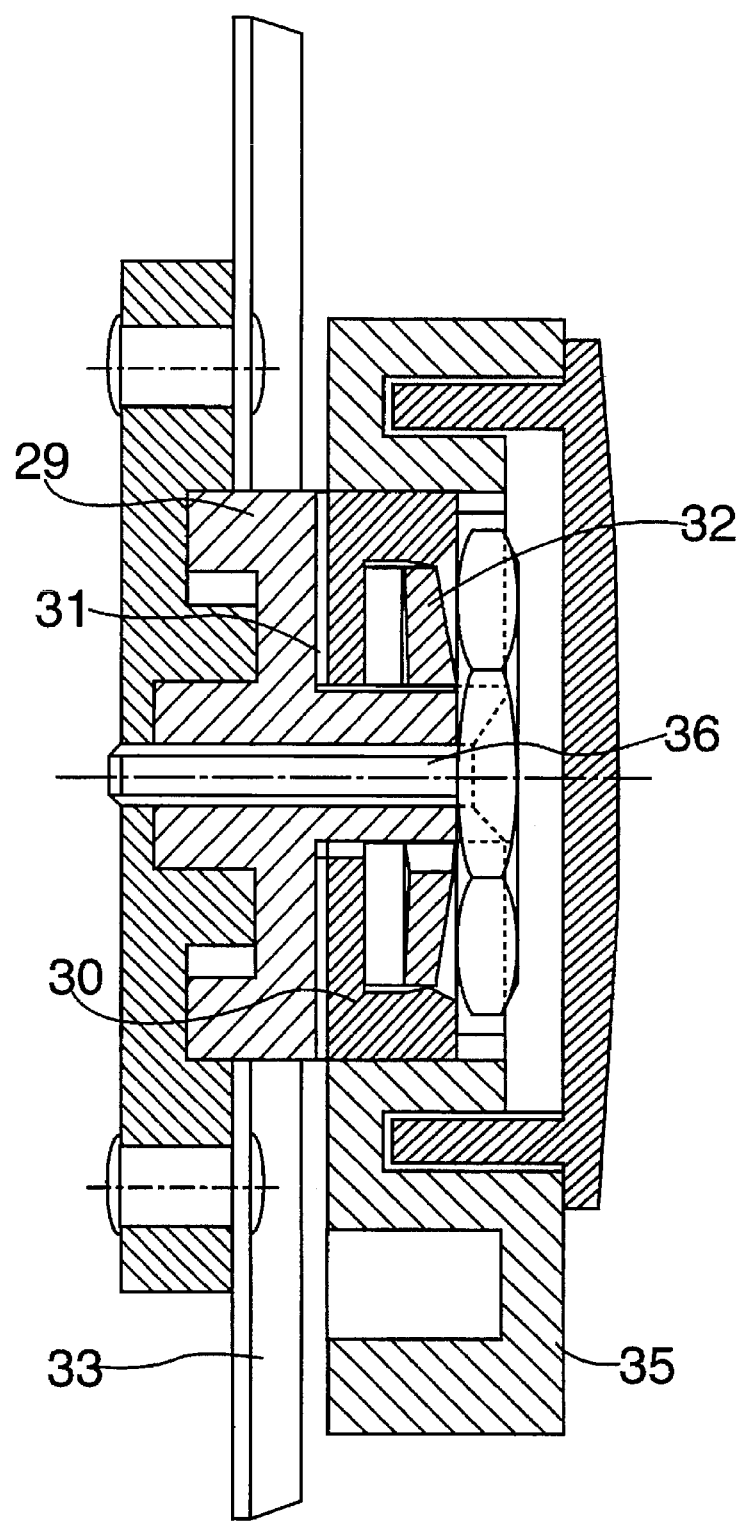
FIG. 5 shows a cross section of a friction brake of a pivot bearing in accordance with the present invention.

A friction brake for a pivot joint consists, according to FIG. 5, of a brake disk 29 and a pressure element 30 with a brake lining 31, which are pressed together by a disk spring 32. Brake disk 29 is joined to housing 33 of a display unit by means of a chassis. Pressure element 30 is guided and held in side face 35 of a foot. A bolt 36 prevents any axial deflection of side face 35 of the housing. A friction brake of this kind has the advantage that it requires relatively little room, adjusts automatically by means of disk springs 32, and allows stepless pivoting of the display unit.

What is claimed is:

1. An electronic appliance with a display unit and a keyboard, comprising:
   two laterally arranged lateral supports, the display unit being pivotable on the two lateral supports, each of the two lateral supports including:
   a base part for providing a secure footing, each base part including a support mount in a front portion of the base part, and
   a side member extending upward from a rear portion of the base part, each side member including a pivot bearing,
   wherein the display unit is pivotally supported approximately about its center of gravity by the pivot bearings of the side members and a rear portion of the keyboard is received by the support mounts of the base parts.

2. The electronic appliance of claim 1, wherein:
   the keyboard and display unit are configured substantially as flat modules with approximately the same outline;
   the support mounts and pivot bearings are arranged with respect to one another such that in a vertical position, the keyboard and the display unit are directly opposite one another and the electronic appliance is approximately rectangular; and
   a locking mechanism is provided for securing the electronic appliance in the vertical position.

3. The electronic appliance of claim 1, wherein the two lateral supports are interconnected by a rigid interconnection.

4. The electronic appliance of claim 3, wherein the rigid interconnection includes a support that is extendable in a rearward direction for increasing the stability of the electronic appliance against tipping over.

5. The electronic appliance of claim 3, wherein the support mounts of the base parts are configured as releasable pivot bearings so that the keyboard is removable.

6. The electronic appliance of claim 3, wherein a helical keyboard cable for electrical interconnection of the keyboard and the display unit is guided via a bearing through a first of the lateral supports, through a conduit with a U-shaped cross section extending in the rigid interconnection, to the second lateral support and via the pivot bearing of the side member of the second lateral support into the display unit.

7. The electronic appliance of claim 1, wherein at least one of the two pivot bearings of the side members includes a friction brake.

8. The electronic appliance of claim 7, wherein the friction brake includes:
   a brake disk,
   a disk-shaped brake lining, and
   a disk spring,
   wherein the brake disk and brake lining are arranged coaxially along a pivot axis of the pivot bearing and the disk spring presses the brake disk and brake lining together.

9. The electronic appliance of claim 1, wherein the display unit and the keyboard are part of a programming machine for stored program controls.

* * * * *